(12) United States Patent
Oota

(10) Patent No.: US 10,276,205 B2
(45) Date of Patent: Apr. 30, 2019

(54) LIBRARY CONTROL DEVICE AND LIBRARY CONTROL METHOD FOR REMOVING MALFUNCTIONING MEDIA FROM MAGAZINE BY REWRITING ITS SLOT POSITION

(71) Applicant: NEC Platforms, Ltd., Kawasaki-shi, Kanagawa (JP)

(72) Inventor: Naoto Oota, Kawasahi (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/548,324

(22) PCT Filed: Feb. 1, 2016

(86) PCT No.: PCT/JP2016/052896
§ 371 (c)(1),
(2) Date: Aug. 2, 2017

(87) PCT Pub. No.: WO2016/125733
PCT Pub. Date: Aug. 11, 2016

(65) Prior Publication Data
US 2018/0018996 A1  Jan. 18, 2018

(30) Foreign Application Priority Data

Feb. 5, 2015  (JP) .................................. 2015-021365

(51) Int. Cl.
*G11B 17/22* (2006.01)
*G11B 15/68* (2006.01)

(52) U.S. Cl.
CPC .............. *G11B 17/22* (2013.01); *G11B 15/68* (2013.01); *G11B 15/689* (2013.01); *G11B 17/228* (2013.01); *G11B 2220/41* (2013.01)

(58) Field of Classification Search
None
See application file for complete search history.

(56) References Cited

U.S. PATENT DOCUMENTS

| 5,884,298 | A  | * | 3/1999 | Smith, II | G11B 27/002 |
| 7,136,988 | B2 | * | 11/2006 | Gallo | G11B 17/225 |
|  |  |  |  |  | 711/217 |
| 2002/0196716 | A1 | * | 12/2002 | Morisaki | G11B 15/689 |
|  |  |  |  |  | 369/30.35 |

FOREIGN PATENT DOCUMENTS

| JP | 8-31129 | 2/1996 |
| JP | 8-212663 | 8/1996 |

(Continued)

OTHER PUBLICATIONS

Computer Translation of JP 08-031129, Feb. 2, 1996.*
International Search Report dated Apr. 19, 2016, in corresponding PCT International Application.

*Primary Examiner* — Tan X Dinh
(74) *Attorney, Agent, or Firm* — Finnegan, Henderson, Farabow, Garrett & Dunner, L.L.P.

(57) ABSTRACT

A library control device moves a desired record medium from a magazine, which is configured to load a plurality of record media into a plurality of slots, to a drive so as to read or write data. The library control device stores identifications of record media in correlation with slots loading recording media. Upon detecting a malfunction in reading or writing data with a record medium, an operator needs to extract the record medium from the magazine. At this time, the library control device rewrites the identification of a slot, which is stored in correlation with the record medium subjected to extraction, with the identification of a predetermined slot so as to move the record medium to the predetermined slot. Thus, it is possible for an operator to (Continued)

extract the record medium detecting a malfunction from the predetermined slot without making any mistake.

7 Claims, 8 Drawing Sheets

(56) References Cited

FOREIGN PATENT DOCUMENTS

| | | |
|---|---|---|
| JP | 2009-230839 | 10/2009 |
| JP | 2011-165239 | 8/2011 |
| JP | 2014-135104 | 7/2014 |
| JP | 2014-191850 | 10/2014 |

* cited by examiner

FIG. 4

| PROPER SLOT POSITION | TEMPORARY SLOT POSITION | MEDIA PRESENCE/ABSENCE INFORMATION | MEDIA IDENTIFICATION | MEDIA STATUS |
|---|---|---|---|---|
| #1 | #1 | PRESENCE | #A | -- |
| #2 | #2 | PRESENCE | #B | -- |
| : | : | : | : | : |
| : | : | : | : | : |
| #29 | #29 | PRESENCE | #C | -- |
| #30 | #30 | PRESENCE | #D | -- |
| DRIVE #1 | DRIVE #1 | ABSENCE | -- | -- |
| DRIVE #2 | DRIVE #2 | ABSENCE | -- | -- |
| ACCESSOR | ACCESSOR | ABSENCE | -- | -- |

FIG. 6

| PROPER SLOT POSITION | TEMPORARY SLOT POSITION | MEDIA PRESENCE/ABSENCE INFORMATION | MEDIA IDENTIFICATION | MEDIA STATUS |
|---|---|---|---|---|
| #1 | #29 | PRESENCE | #A | MALFUNCTION |
| #2 | #2 | PRESENCE | #B | -- |
| ⋮ | ⋮ | ⋮ | ⋮ | ⋮ |
| ⋮ | ⋮ | ⋮ | ⋮ | ⋮ |
| #29 | #1 | PRESENCE | #C | -- |
| #30 | #30 | PRESENCE | #D | -- |
| DRIVE #1 | DRIVE #1 | ABSENCE | -- | -- |
| DRIVE #2 | DRIVE #2 | ABSENCE | -- | -- |
| ACCESSOR | ACCESSOR | ABSENCE | -- | -- |

FIG. 7

| PROPER SLOT POSITION | TEMPORARY SLOT POSITION | MEDIA PRESENCE/ABSENCE INFORMATION | MEDIA IDENTIFICATION | MEDIA STATUS |
|---|---|---|---|---|
| #1 | #29 | PRESENCE | #A | MALFUNCTION |
| #2 | #2 | PRESENCE | #B | — |
| : | : | : | : | : |
| : | : | : | : | : |
| #29 | #1 | PRESENCE | #C | — |
| #30 | ACCESSOR | PRESENCE | #D | — |
| DRIVE #1 | DRIVE #1 | ABSENCE | — | — |
| DRIVE #2 | DRIVE #2 | ABSENCE | — | — |
| ACCESSOR | #30 | ABSENCE | — | — |

LIBRARY CONTROL DEVICE AND LIBRARY CONTROL METHOD FOR REMOVING MALFUNCTIONING MEDIA FROM MAGAZINE BY REWRITING ITS SLOT POSITION

TECHNICAL FIELD

The present invention relates to a library control device and a library control method, which are designed to efficiently manage record media in a library device having a plurality of record media.

This application is a National Stage Entry of International Application No. PCT/JP2016/052896, filed Feb. 1, 2016, which claims the benefit of priority from Japanese Patent Application No. 2015-021365, filed Feb. 5, 2015. The entire contents of the above-referenced applications are expressly incorporated herein by reference.

BACKGROUND ART

Library devices are known as devices used to store numerous data. A library device includes a magazine serving as a storage rack that can store a number of record media, a drive that executes read/write processes for record media, and an accessor that carries record media from a magazine to a drive. The magazine can be detachably attached to the library device, wherein the magazine has a plurality of slots for loading a plurality of record media.

Various documents are known about library devices. For example, Patent Literature 1 discloses a library device equipped with an error insertion-preventing mechanism and an ejection receiving mechanism while Patent Literature 2 discloses a library device equipped with a magazine holding structure that can change a drawing amount of a magazine in a stepwise manner.

Due to an error occurring in record media of a library device, it is necessary to remove a magazine holding erroneous record media. That is, an operator needs to open a magazine and thereby remove erroneous record media. When an operator open a magazine in a library device, it is necessary to carry out an inventory operation to confirm the presence/absence and allocation of record media with respect to all the slots in a magazine.

Patent Literature 1 and Patent Literature 2 discloses technologies concerning magazines that allow part of slots to be pulled out. That is, it is possible to reduce an execution time for an inventory operation by executing an inventory operation for part of slots being drawn out from a magazine.

CITATION LIST

Patent Literature

Patent Literature 1: Japanese Patent Application Publication No. 2011-165239
Patent Literature 2: Japanese Patent Application Publication No. 2009-230839

SUMMARY OF INVENTION

Technical Problem

In a library device in which recording media are each stored in a predetermined slot of a magazine, an operator needs to find a slot having record media causing errors and thereby extract erroneous record media from the slot. Using a magazine disclosed in Patent Literature 1 and Patent Literature 2, an operator needs to input a command for moving erroneous record media to a slot having drawability into a library device and thereby draw them from the slot. When an operator exchanges erroneous record media with new record media, however, an operator may have a possibility of mistakenly extracting record media from another slot. In addition, an operator may have a possibility of inputting into a library device a command for mistakenly moving other record media to a slot having drawability.

The present invention aims to provide a library control device and a library control method, which allow an operator to extract record media by reliably moving record media subjected to extraction to a predetermined slot in a magazine.

Solution to Problem

A first aspect of the present invention relates to a library control device that moves a desired record medium from a magazine, which is configured to load a plurality of record media into a plurality of slots, to a drive so as to read or write data. The library control device includes a storage unit configured to store identifications of record media in correlation with identifications of slots loading record media; a movement instruction part configured to move the record medium to the slot which is stored on the storage unit in correlation with the record medium; and a slot rewrite part configured to rewrite the identification of the slot, which is stored on the storage unit in correlation with the record medium subjected to extraction, with an identification of a predetermined slot.

A second aspect of the present invention relates to a library device. The library device includes a magazine configured to load a plurality of record media into a plurality of slots; an accessor configured to selectively carry the record medium from the magazine; a drive configured to read or write data with the record medium carried by the accessor; and the aforementioned library control device.

A third aspect of the present invention relates to a storage device including a host computer and the aforementioned library device. The host computer retrieves data read from record media in the library device and provides the library device with data to be recorded on record media.

A fourth aspect of the present invention relates to a library control method that moves a desired record medium from a magazine, which is configured to load a plurality of record media into a plurality of slots, to a drive so as to read or write data. The library control method includes the steps of: storing identifications of record media in correlation with identifications of slots loading record media; rewriting the identification of the slot, which is stored in correlation with the record medium subjected to extraction, with an identification of a predetermined slot; and moving the record medium subjected to extraction to the predetermined slot.

A fifth aspect of the present invention relates to a program executed by a computer that moves a desired record medium from a magazine, which is configured to load a plurality of record media to a plurality of slots, to a drive so as to read or write data. The program implements a process for storing identifications of record media in correlation with identifications of slots loading record media; a process for rewriting the identification of the slot, which is stored in correlation with the record medium subjected to extraction, with an identification of a predetermined slot; and a process for moving the record medium subjected to extraction to the predetermined slot.

Advantageous Effects of Invention

According to the present invention, record media subjected to extraction are automatically moved to a predetermined slot. This makes it possible for an operator to extract recording media from the predetermined slot without making any mistake. In addition, the present invention has the stored positional relationship between record media and slots in a magazine, and therefore it automatically rewrites a slot position, which is stored in connection with recording media when record media subjected to extraction are moved to a predetermined slot, with a predetermined slot position, thus automatically updating the positional relationship between record media and slots. Moreover, the present invention moves record media subjected to extraction to a predetermined slot alone, and therefore an operator may easily open a cover of a magazine so as to extract record media.

BRIEF DESCRIPTION OF DRAWINGS

FIG. 4 is a table describing an example of slot-media allocation information stored on the library control device.

FIG. 6 is a table describing an example of slot-media allocation information that is rewritten when the library control device detects a malfunction in record media.

FIG. 7 is a table describing an example of slot-media allocation information that is rewritten according to a users open instruction for a cover of a magazine.

DESCRIPTION OF EMBODIMENTS

The present invention will be described in detail with respect to a library control device and a library control method with reference to the accompanying drawings.

Figure 1:
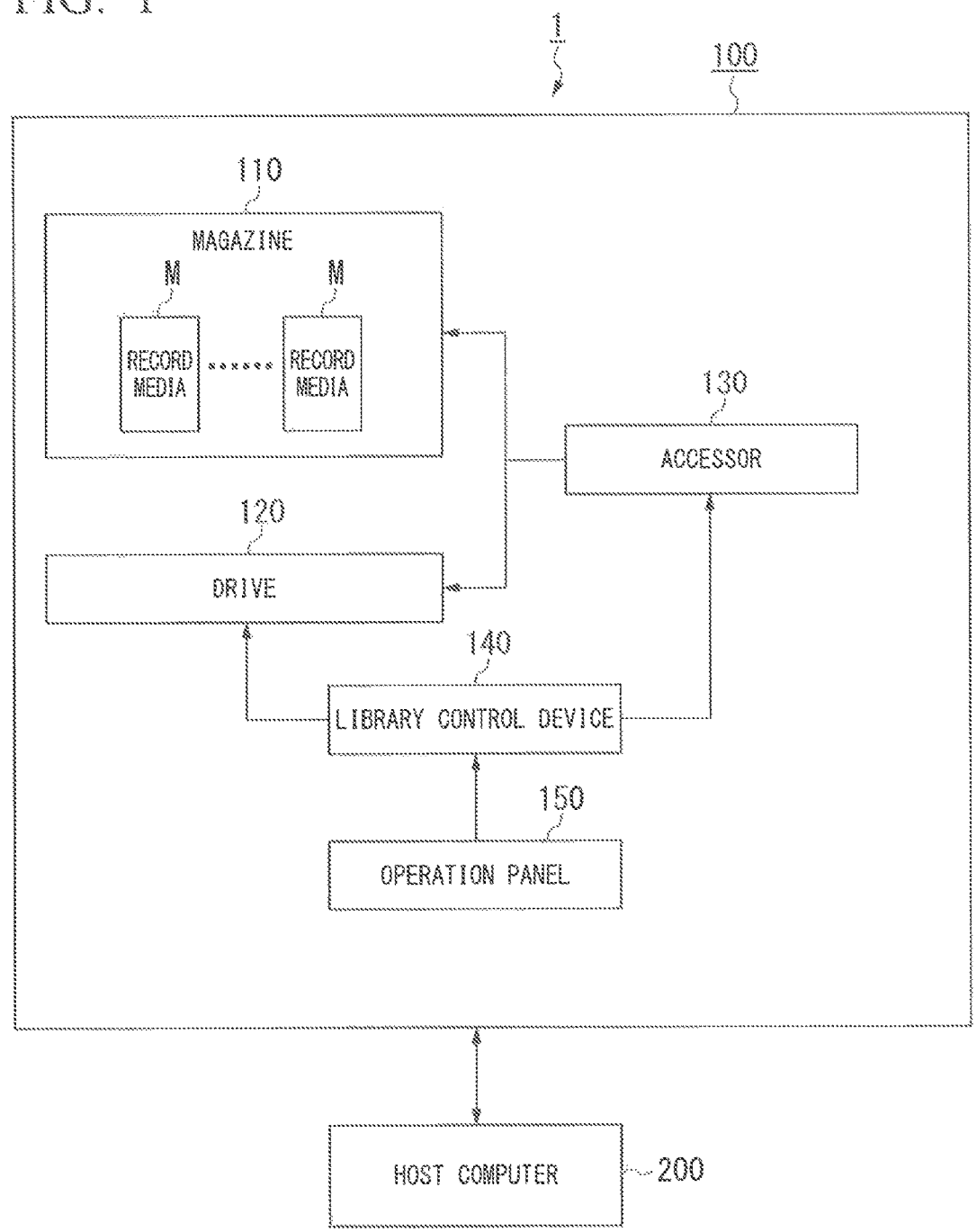
FIG. 1 is a block diagram of a storage device including a library device and a host computer relating to the present invention.

FIG. 1 is a block diagram of a storage device including a library device and a host computer relating to the present invention. The library device 100 carries out read/write processes for data on multiple record media M. The host computer 200 reads from the library device 100 data recorded on record media M and outputs to the library device 100 data to be recorded on record media M.

The library device 100 includes a magazine 110, a drive 120, an accessor 130, a library control device 140, and an operation panel 150. The magazine 110 is a storage rack capable of storing multiple record media M. The drive 120 executes read/write processes for data on record media M. The accessor 130 carries record media M between the magazine 110 and the drive 120. The library control device 140 controls the drive 120 and the accessor 130. The operation panel 150 is operated by an operator to input a control command for the library control device 140. In addition, the operation panel 150 displays information for an operator.

Figure 2:
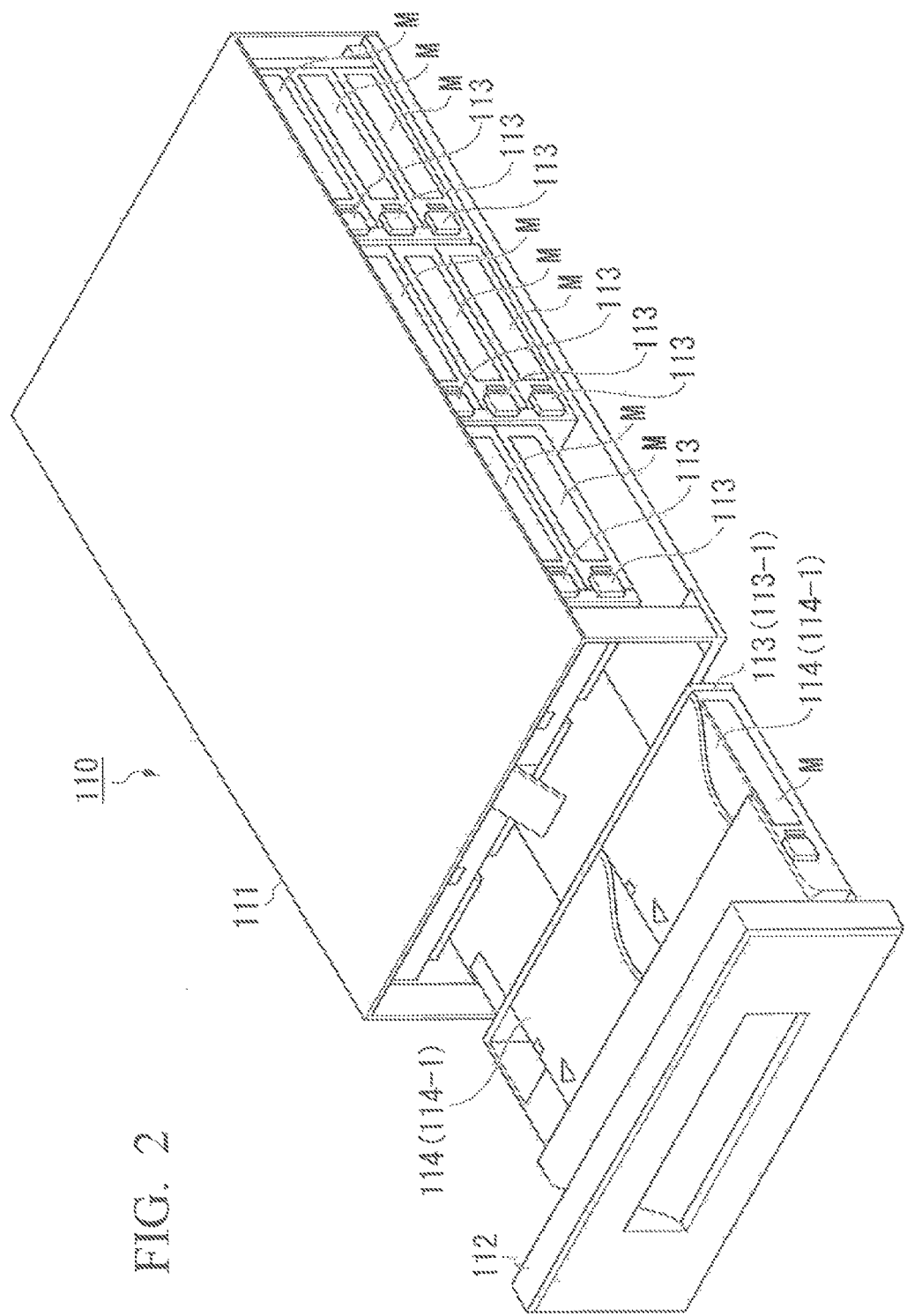
FIG. 2 is a perspective view of a magazine installed in the library device shown in FIG. 1.

FIG. 2 is a perspective view of the magazine 110 installed in the library device 100. The magazine 110 includes a casing 111, a cover 112, and a plurality of magazine cells held inside the casing 111. The magazine 110 shown in FIG. 2 includes nine magazine cells 113; but the number of magazine cells is not necessarily limited to nine.

The magazine cell 113 is a case capable of storing one or more record media M. The magazine cell 113 has a plurality of slots 114 for loading record media M. As shown in FIG. 2, the magazine cell 113 has two slots 114; but the number of slots 114 is not necessarily limited to two. Among magazine cells 113, a single magazine cell 113 (hereinafter, referred to as an IO cell 113-1) adjoining the cover 112 is attached to the cover 112. Thus, the IO cell 113-1 can be detached from the magazine 110 due to detachment of the cover 112. Hereinafter, each of slots 114 formed in the IO cell 113-1 will be referred to as an IO slot 114-1.

Figure 3:
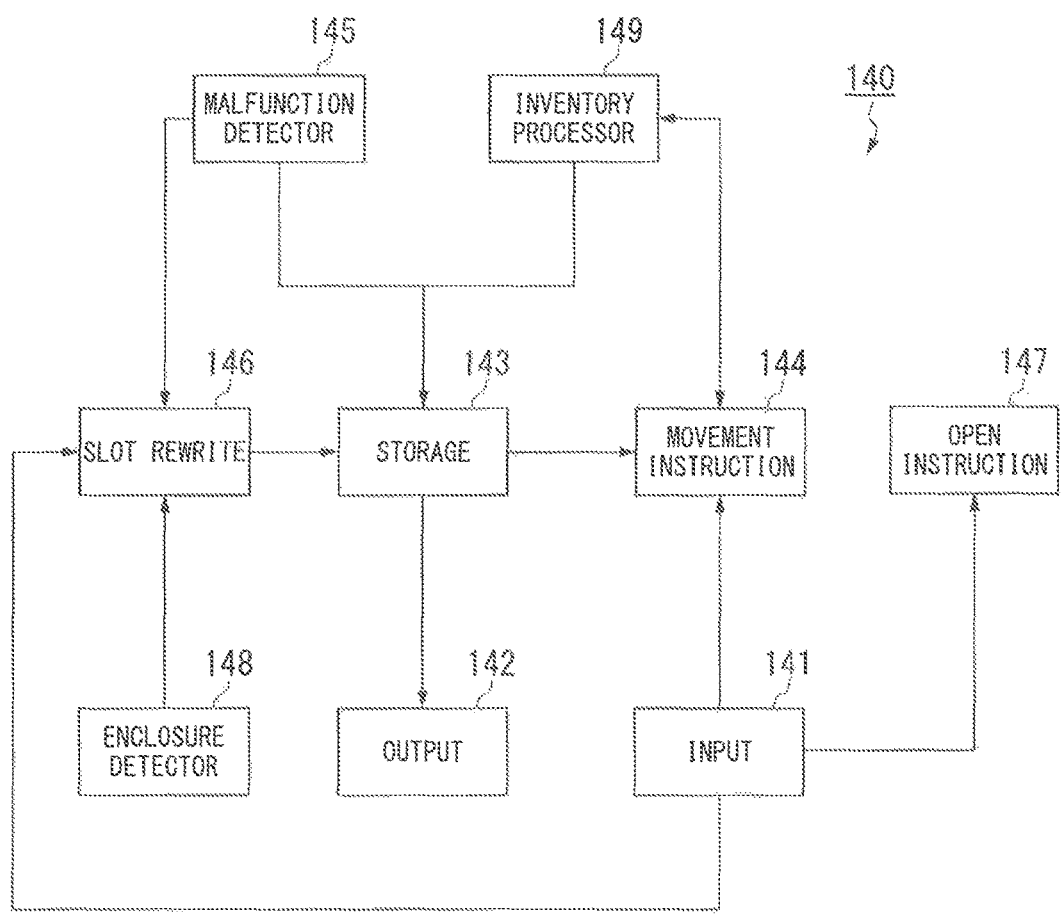
FIG. 3 is a block diagram showing the configuration of a library control device according to one embodiment of the present invention.

FIG. 3 is a block diagram of the library control device 140 according to one embodiment of the present invention. The library control device 140 includes an input part 141, an output part 142, a storage unit 143, a movement instruction part 144, a malfunction detector 145, a slot rewrite part 146, an open instruction part 147, an enclosure detector 148, and an inventory processor 149.

The input part 141 receives an operator's control command input thereto through the operation panel 150. As an example of a control command, for example, it is possible to mention a read instruction and a write instruction for record media M as well as an open instruction for the cover 112 of the magazine 110. In addition, the input part 141 notifies the host computer 200 of the movement result of record media M by the accessor 130. The output part 142 displays commands for an operator on the operation pane 150. As an example of commands for an operation, for example, it is possible to mention an exchange instruction of record media M.

FIG. 4 shows an example of slot-media allocation information stored on the storage unit 143 of the library control device 140. The storage unit 143 stores positions of the slots 114 in the magazine cell 113, media presence/absence information indicating whether or not the record media M are inserted into the slots 114, identification of record media M, and states of the record media M in connection with each other. As the position of each slot 114, the storage unit 143 stores "temporary slot position" representing a temporary storage position of record media M and "proper slot position (master data)" representing the original storage position of record media M. The storage unit 143 stores "the position of the slot 114" that refers to the drive 120 and the accessor 130 as well as the slot(s) 114. Herein, the drive 120 or the accessor 130 indicates that none of record media M is inserted into the slot 114 in the normal condition (i.e. any condition other than the condition of detecting malfunction of record media and the condition of the cover 112 being opened). In the slot-media allocation information of FIG. 4, the term "absence" is stored as the "media presence/absence information" of each record in connection with the "proper slot position" indicating the drive 120 or the accessor 130. As the identification of record media M, an identification such as bar codes is attached to the record media M and read by a recorder installed in the accessor 130.

The storage unit 143 stores an IO slot flag as to whether or not the IO slot 114-1 is valid. Herein, the validity of the IO slot 114-1 indicates that the IO slot 114-1 is regarded as a slot used to detachably attach the record media M thereto, in other words, the IO slot is not regarded as a slot used to read data. On the other hand, the invalidity of the IO slot 114-1 indicates that the IO slot 114-1 is regarded as a slot used to read data like other slots.

The movement instruction part 144 reads from the storage unit 143 the information concerning the slot 114 loading the record media M subjected to movement so as to output to the accessor 130 an instruction to move the record media M between the slot 114 and the drive 120. The malfunction detector 145 determines whether or not any malfunction has occurred in the record media whose data are loaded to the drive 120. The malfunction detector 145 rewrites the status of the record media M with a "malfunction status" on the storage unit 143 when any malfunction has occurred in the record media M.

Upon detecting a malfunction in the record media M, the slot rewrite part 146 rewrites the position of the slot 114 (i.e. the temporary slot position) correlated to the record media M with the position of the IO slot 114-1. In addition, when an operator closes the cover 112 of the magazine 110 after detecting a malfunction in the record media M, the slot rewrite part 16 rewrites the position of the slot 114, correlated to the record media M having detected a malfunction, with the original slot position.

When the input part 141 receives a command to remove the cover 112 input thereto, the open instruction part 147 outputs an instruction to open the cover 112 to the magazine 110. The enclosure detector 148 detects whether or not the cover 112 of the magazine 110 is closed. The inventory processor 149 carries out an inventory process for the record media M inserted into the IO slot 114-1 when the cover 112 of the magazine 110 is closed.

Figure 5:
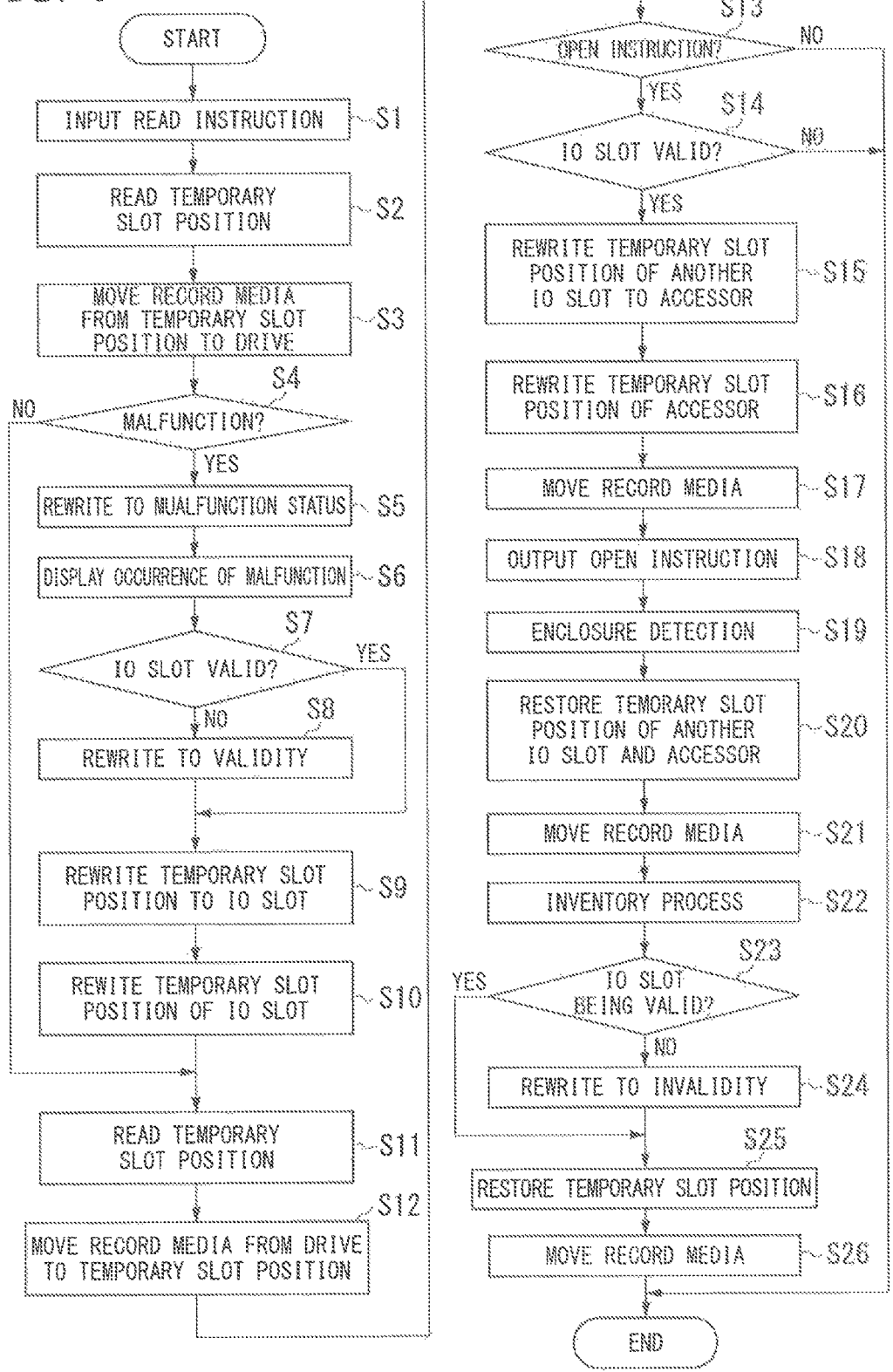
FIG. 5 is a flowchart showing a procedure for the library control device.

Next, the operation of the library control device 140 will be described in detail with reference to FIG. 5. FIG. 5 is a flowchart showing a procedure of the library control device 140. When a user operates the operation panel 150 to input a read command for the record media M, the input part 141 receives the read command (step S1). The movement instruction part 144 reads from the storage unit 143 the temporary slot position correlated to the identification of the record media M indicated by the read command (step S2). Next, the movement instruction part 144 sends to the accessor a movement instruction to move the record media M, which should be inserted into the slot 114 corresponding to the temporary slot position to the drive 120 (step S3). The accessor 130 moves the record media M to the drive 120 in accordance with the movement instruction. The drive 120 reads data from the record media M which is moved by the accessor 130.

The malfunction detector 145 determines whether or not to detect a malfunction in the record media M until completion of reading data (step S4). Upon receiving from the drive 120 a notice indicating a malfunction detected in the record media M, the malfunction detector 145 determines that a malfunction has occurred in the record media M (step S4: YES). The malfunction detector 145 rewrites the status of the record media M causing a malfunction with the "malfunction status" with reference to the storage unit 143 (step S5). Next, the output part 142 displays on the operation panel 150 a message that a malfunction has occurred in the record media M (step S6).

Next, the slot rewrite part 146 determines whether or not the IO slot flag is "valid" with reference to the storage unit 143 (step S7). When the IO slot flag is "invalid" (step S7: NO), the slot rewrite part 146 temporarily rewrites the IO slot flag to be "valid" (step S8). On the other hand, when the IO slot flag is "valid" (step S7: YES), or when the IO slot flag is rewritten to be "valid" in step S8, the slot rewrite part 146 rewrites the temporary slot position, correlated to the record media M causing malfunction, with the identification of the "IO slot 144-1" (step S9).

At this time, the slot rewrite part 146 rewrites the temporary slot position, corresponding to the IO slot 114-1, with the proper slot position correlated to the record media M causing a malfunction (step S10). That is, the slot rewrite part 146 rewrites the temporary slot position, correlated to the identification of the record media M subjected to extraction, with the identification of the "IO slot 114-1" on the condition that the storage unit 143 stores the correlation between the IO slot 114-1 and other record media M, and the slot rewrite part 146 rewrites the temporary slot position correlated to other record media M with the proper slot position correlated to the identification of the recent media M subjected to extraction. This makes it possible for the library control device 140 to secure the slot 114 used to load other record media M even when other record media M is inserted into the IO slot 114-1.

FIG. 6 shows an example of slot-media allocation information that is rewritten by the library control device 140 upon detecting malfunction in the record media M. Hereinafter, the procedure how to rewrite the stored information of the storage unit 143 will be described in conjunction with steps S9 through S10 in FIG. 5. The following description is made based on the assumption that the storage unit 143 has stored the slot-media allocation information shown in FIG. 4 before detecting a malfunction in the record media M having the identification "#A". Specifically, the storage unit 143 stores correlations such that the identification "#1" of the slot 114 is correlated to the identification "#A" of the record media M; the identification "#2" of the slot 114 is correlated to the identification "#B" of the record media M; the identification "#29" of the slot 114 correlated to the identification "#C" of the record media M; the identification "#30" of the slot 114 is correlated to the identification "#D" of the record media M. Herein, the slots 114 having the identifications "#29" and "#30" correspond to the IO slots 114-1.

In step S9, the slot rewrite part 146 rewrites the temporary slot position, correlated to the record media M having the identification "#A", with the identification "#29" of the slot 114 corresponding to the IO slot 114-1. In step S10, the slot rewrite part 146 rewrites the temporary slot position, correlated to the identification "#29" of the slot 114 corresponding to the IO slot 114-1, with the proper slot position correlated to the identification "#1" of the slot 114.

Returning to FIG. 5, when no malfunction is detected in the record media M until completion of reading data (step S4: NO), or when the slot rewrite part 146 rewrites the temporary slot position for the record media M, the movement instruction part 144 reads the temporary slot position stored on the storage unit 143 in connection with the identification of the record media M relating to a read instruction which is input in step S1 (step S11). Next, the movement instruction part 144 sends to the accessor 130 a movement instruction to move the record media M, which has been moved to the drive 120, to the slot 114 corresponding to the temporary slot position (step S12).

The record media M not having detected malfunction is inserted into the original slot 114 while the record media M causing malfunction is inserted into the predetermined slot 114, i.e. the IO slot 114-1. At this time, the movement instruction part 144 reads the proper slot position of the record media M from the storage unit 143 so as to notify the host computer 200 of a message that the record media M has been moved to the proper slot position. Thus, the library device 100 notifies the host computer 200 of a message that the record media M has been normally inserted into the slot 114.

Next, the input part 114 determines whether or not to receive an open command for the cover 112 of the magazine 110 from a user (step S13). In step S6, a user inputs an open command for the cover 112 to remove or exchange the record media M when the operation panel 150 displays a message that a malfunction has occurred in the record media M. When an open command for the cover 112 is not input by a user (step S13: NO), the library control device 140 exits the procedure of FIG. 5.

Upon inputting an open command for the cover 112 from a user (step S113: YES), the open instruction part 147 determines whether or not the IO slot flag is "valid" with reference to the storage unit 143 (step S14). When the IO slot flag is "invalid" (step S14: NO), the library device 100 exits the procedure of FIG. 5 without sending an open instruction for the cover 112 to the magazine 110. On the other hand, when the IO slot flag is "valid" (step S14: YES), the slot rewrite part 146 rewrites the temporary slot position of another IO slot 114-1, whose temporary slot position has not been rewritten, with the accessor 130 (step S15). At this time, the slot rewrite part 146 rewrites the temporary slot position of the accessor 130 to be identical to another IO slot 114-1 whose temporary slot position was rewritten in step S15 (step S16).

FIG. 7 shows an example of slot-media allocation information that is rewritten according to the open instruction for the cover 112 of the magazine 110. Herein, the procedure how to rewrite slot-media allocation information with the storage unit 143 will be described in conjunction with steps S15 and S16 of FIG. 5. The following description is made based on the assumption that the storage unit 143 has stored the slot-media allocation information of FIG. 6 before inputting an open instruction for the cover 112. In step S15, the slot rewrite part 146 rewrites the temporary slot position, correlated to the identification "#30" of the slot 114 corresponding to the IO slot 114-1, with the accessor 130. In step S16, the slot rewrite part 146 rewrites the temporary slot position, corresponding to the accessor 130, with the identification "#30" of the slot 114.

Next, the movement instruction part 144 sends an instruction for the accessor 130 to hold other record media M, which should be inserted into the slot 114 not loading the record media M having detected a malfunction among two IO slots 114-1, according to the slot-media allocation information on the storage unit 143 (step S17). This may vacate the slot 114 not loading the record media M having detected malfunction among two IO slots 114-1.

Next, the open instruction part 147 sends an open instruction for the cover 112 to the magazine 110 (step S18). This makes it possible for an operator to pull out the IO cell 113-1 from the magazine 110, and therefore an operator may remove or exchange the record media M with the IO slot 114-1. At this time, the record media M should be inserted into only one of two IO slots 114-1 arranged in the IO cell 113-1. Thus, an operator may remove or exchange the record media M causing a malfunction.

After removing or exchanging the record media M with the IO slot 114-1, an operator closes the cover 112 to enclose the IO cell 113-1 in the magazine 110. When the enclosure detector 148 detects that the IO cell 113-1 is enclosed in the magazine 110 (step S19), the slot rewrite part 146 rewrites the temporary slot positions, correlated to the accessor 130 and the slot 114 not loading the record media M having detected a malfunction, with their proper slot positions (step S20).

Next, the movement instruction part 144 sends an instruction to insert the record media M hold by the accessor 130 into the IO slot 114-1 according to the slot-media allocation information on the storage unit 143 (step S21). The inventory processor 149 carries out an inventory process for the IO slot 114-1 so as to store its result on the storage unit 143 (step S22). The slot rewrite part 146 determines whether or not the step S7 has determined that the IO slot flag is "valid" (step S23). When the step S7 has determined that the IO slot flag is "invalid" (step S23: NO), the slot rewrite part 146 rewrites the IO slot flag to be "invalid" on the storage unit 143 (step S24).

When it is determined that the IO slot flag is "valid" (step S23: YES), or when the IO slot flag is rewritten to be "invalid" in step S24, the slot rewrite part 146 rewrites all the temporary slot positions with their proper slot positions (step S25). Next, the movement instruction part 144 sends an instruction to insert the record media M into its original slot 114 according to the slot-media allocation information on the storage unit 143 (step S26). Then, the movement instruction part 144 notifies the host computer 200 of the result of an inventory process, thus exiting the procedure of FIG. 5.

As described above, the library control device 140 of the present embodiment rewrites the temporary slot position, correlated to the identification of the record media M subjected to extraction, with the IO slot 114-1 with reference to the storage part 143. Thus, the record media M subjected to extraction is inserted into the IO slot 114-1, and therefore an operator may extract the record media M from the IO slot 114-1 without making any mistake.

According to the present embodiment, it is possible to insert the record media M subjected to extraction into the IO slot 114-1. Due to releasing of the cover 112 from the magazine 110, it is possible to extract the record media M from the IO slot 114-1 alone. Compared with the conventional technology for carrying out an inventory process for all the slots 114, the library control device 140 of the present embodiment is able to significantly reduce an execution time of an inventory process. In addition, it is possible to improve availability of the library device 100 according the present embodiment since the library device 100 is unable to receive the next instruction during execution of an inventory process.

According to the present embodiment, the library control device 140 is able to rewrite the temporary slot position with the original position (i.e. the proper slot position) when the cover 112 of the magazine 110 is closed. Thus, it is possible to return the loading position of the record media M to its original position when a user extracts the record media M subjected to extraction so that the IO slot 114-1 is restored to its original condition.

According to the present embodiment, the library control device 140 correlates other record media to the accessor 130 instead of the IO slot 114-1 when rewriting the temporary slot position, correlated to the identification of the record media M subjected to extraction, with the IO slot 114-1 on the condition that the storage unit 143 stores correlation between other record media M and another IO slot 114-1. Herein, "another IO slot 114-1" is positioned adjacent to the IO slot 114-1 loading the record media M subjected to extraction in the IO cell 113-1. Thus, the record media M subjected to extraction is solely loaded into the IO cell 113-1 when the cover 112 is released from the magazine 110.

The present invention is described in detail with reference to FIG. 1 through FIG. 7, but concrete configurations should not be limited to the present embodiment; hence, it is possible to provide various changes in design. The foregoing embodiment handles the record media M having detected a malfunction (or a failure) as an object to be extracted; but this is not a restriction. For example, it is possible to use a cleaning medium exceeding usable limitation as an object to be extracted.

In the foregoing embodiment, the slot rewrite part 146 rewrites the temporary slot position for the record media M loaded into another IO slot 114-1 with the accessor 130; but this is not a restriction. For example, it is possible to rewrite the temporary slot position for the record media loaded into another IO slot 114-1 with the drive 120. When the magazine 110 includes at least one slot 114 loading no record media M, the slot rewrite part 146 may rewrite the temporary slot position for the record media M loaded to another IO slot 114-1 with the slot 114 loading no record media M.

In the foregoing embodiment, the record media M loaded to the IO slot 114-1 of the IO cell 113-1 is regarded as record media subjected to extraction when the cover 112 is released from the magazine 110; but this is not a restriction. For example, it is possible to load multiple record media M into the IO slots 114-1 of the IO cell 113-1 when the cover 112 is released from the magazine 110. In this case, an operator may have a possibility of mistakenly extracting the record media M not subjected to extraction from the IO slot 114-1. However, it is possible to prevent an operator from mistakenly extracting the record media M by determining the IO slot 114-1 for loading the record media M subjected to extraction in advance.

Figure 8:
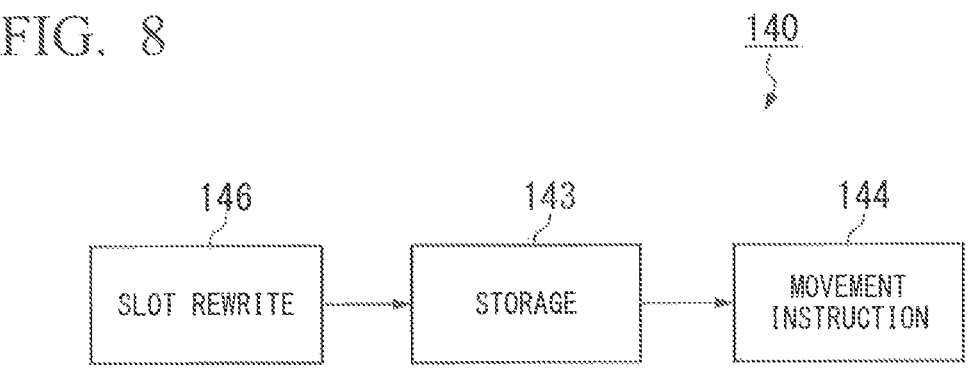
FIG. 8 is a block diagram showing the basic configuration of a library control device.

Next, the basic configuration of the library control device 140 according to the present invention will be described with reference to FIG. 8. FIG. 8 is a block diagram showing the basic configuration of the library control device 140. The foregoing embodiment refers to the library control device 140 having the configuration shown in FIG. 3, but the basic configuration of the library control device 140 is shown in FIG. 8. That is, the library control device 140 has the basic configuration including the storage unit 143, the movement instruction part 144, and the slot rewrite part 146.

The storage unit 143 stores the identification of the record media M in correlation with the identification of the slot 114 for loading the record media M. The movement instruction part 144 moves the record media M to the slot 114 correlated to the record media M with reference to the storage unit 143. The slot rewrite part 146 rewrites the identification of the slot 114, correlated to the identification of the record media M subjected to extraction on the storage unit 143, with the identification of the predetermined slot 114. This makes it possible for the library control device 140 to move the record media M subjected to extraction to the predetermined slot 114. In addition, an operator may reliably extract the record media M subjected to extraction from the predetermined slot 114.

Figure 9:
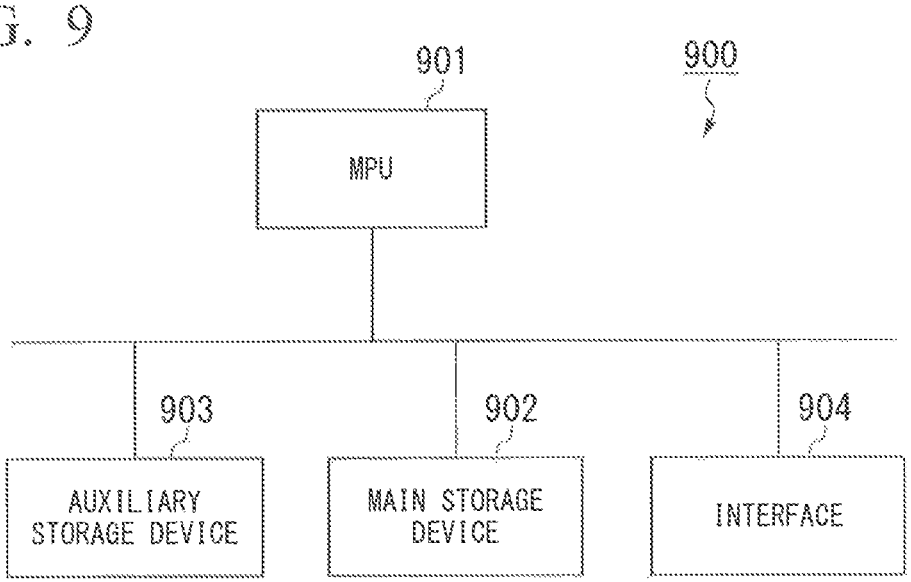
FIG. 9 is a block diagram showing the configuration of a computer that can implement the function of a library control device.

FIG. 9 is a block diagram of a computer 900 capable of implementing the function of the library control device 140 of the present invention. The computer 900 includes a MPU (Micro Processing Unit) 901, a main storage device 902, an auxiliary storage device 903, and an interface 904. It is possible for the computer 900 to install the function of the library control device 140 therein. The processing of the library control device 140 can be stored on the auxiliary storage device 903 as programs. The MPU 901 loads and executes programs stored on the auxiliary storage device 903. In addition, the MPU 901 secures a storage area corresponding to the storage unit 143 with the auxiliary storage device 903 according to programs.

In the computer 900, the auxiliary storage device 903 is a non-transitory tangible storage medium (e.g. a nonvolatile storage medium). As recording media, it is possible to mention magnetic disks, magneto-optical disks, CD-ROM, DVD-ROM, and semiconductor memory, each of which can be connected through the interface 904. When programs are delivered to the computer 900 through communication lines, the computer 900 may load programs into the main storage device 902 so as to execute programs, thus implementing the foregoing processes.

In addition, programs may realize part of the function of the library control device 140. Moreover, programs may serve as differential files (or differential programs) that can be combined with other programs pre-installed in the auxiliary storage device 903 so as to achieve the foregoing functions.

INDUSTRIAL APPLICABILITY

The present invention relates to a library control device that is able to efficiently move record media causing a malfunction (or failure), among a plurality of record media installed in a library device, to a predetermined slot so that a user can extract the record media. However, the present invention is applicable to technologies of moving desired media to optimum positions so that users can extract them.

REFERENCE SIGNS LIST

1 storage device
100 library device
110 magazine
111 casing
112 cover
113 magazine cell
114 slot
120 drive
130 accessor
140 library control device
141 input part
142 output part
143 storage unit
144 movement instruction part
145 malfunction detector
146 open instruction part
148 enclosure detector
149 inventory processor
150 operation panel
200 host computer

The invention claimed is:

1. A library control device that moves a desired record medium from a magazine, which is configured to load a plurality of record media into a plurality of slots, to a drive to read or write data, the library control device comprising:
   a memory storing instructions; and
   at least one processor configured to execute the instructions to:
      store identifications of the record media in correlation with identifications of the slots loading the record media;

move the record medium to the slot in correlation with the record medium and move the record medium subjected to extraction to a predetermined slot;

detect a malfunction in the record medium subjected to extraction among the plurality of record media; and rewrite the identification of the slot, which is stored in correlation with the record medium subjected to extraction, with an identification of the predetermined slot.

2. A library control device that moves a desired record medium from a magazine, which is configured to load a plurality of record media into a plurality of slots, to a drive to read or write data, the library control device comprising:

a memory storing instructions; and at least one processor configured to execute the instructions to:

store identifications of the record media in correlation with identifications of the slots loading the record media;

move the record medium to the slot in correlation with the record medium and move the record medium subjected to extraction to a predetermined slot;

rewrite the identification of the slot, with the record medium subjected to extraction among the plurality of record media, with an identification of the predetermined slot; and open the magazine and allow the record medium subjected to extraction and loaded to the predetermined slot, wherein the at least one processor restores the identification of the slot, which is correlated to the record medium that is rewritten when the magazine is closed, to its original identification.

3. A library control device that moves a desired record medium from a magazine, which is configured to load a plurality of record media into a plurality of slots, to a drive to read or write data, the library control device comprising:

a memory storing instructions; and at least one processor configured to execute the instructions to:

store identifications of the record media in correlation with identifications of the slots loading the record media;

move the record medium to the slot in correlation with the record medium and move the record medium subjected to extraction to a predetermined slot; and rewrite the identification of the slot, which is in correlation with the record medium subjected to extraction among the plurality of record media, with an identification of the predetermined slot, wherein the predetermined slot is disposed proximate to a cover of the magazine, thus allowing the record medium subjected to extraction and loaded to the predetermined slot upon opening the cover of the magazine.

4. A library control device that moves a desired record medium from a magazine, which is configured to load a plurality of record media into a plurality of slots, to a drive to read or write data, the library control device comprising:

a memory storing instructions; and at least one processor configured to execute the instructions to:

store identifications of the record media in correlation with identifications of the slots loading the record media;

move the record medium to the slot in correlation with the record medium and move the record medium subjected to extraction to a predetermined slot;

rewrite the identification of the slot, which is in correlation with a record medium subjected to extraction among the plurality of record media, with an identification of the predetermined slot when another record medium other than the record medium subjected to extraction is loaded into the predetermined slot, and wherein the at least one processor rewrites the identification of the predetermined slot, which is stored in correlation with another record medium other than the record medium subjected to extraction, with an identification of another slot.

5. The library control device according to claim 4, wherein, according to the storage unit rewritten by the slot rewrite part, the movement instruction part moves another record medium other than the record medium subjected to extraction from the predetermined slot to another slot while moving the record medium subjected to extraction to the predetermined slot.

6. A library control method that moves a desired record medium from a magazine, which is configured to load a plurality of record media into a plurality of slots, to a drive to read or write data, the library control method comprising:

storing identifications of the record media in correlation with identifications of the slots loading the record media;

detecting a malfunction in a record medium subjected to extraction among the plurality of record media;

rewriting the identification of the slot, which is stored in correlation with the record medium subjected to extraction, with an identification of a predetermined slot; and moving the record medium subjected to extraction to the predetermined slot.

7. A non-transitory computer-readable storage medium having at least one processor causing a computer to execute the library control method according to claim 6.

* * * * *